United States Patent [19]

Brantmark et al.

[11] Patent Number: 4,888,708

[45] Date of Patent: Dec. 19, 1989

[54] CONTROL SYSTEM FOR AN INDUSTRIAL ROBOT

[75] Inventors: Håkan Brantmark; åke Lindqvist; Norefors, Ulf-Göran, all of Väster ås, Sweden

[73] Assignee: ASEA Aktiebolag, Västerås, Sweden

[21] Appl. No.: 508,227

[22] Filed: Jun. 27, 1983

[30] Foreign Application Priority Data

Jun. 28, 1982 [SE] Sweden ............................... 8203974

[51] Int. Cl.$^4$ ............................................. G05B 19/42
[52] U.S. Cl. .................................. 364/513; 364/190; 901/3
[58] Field of Search ................ 318/569, 567; 364/171, 364/174, 188, 189, 190, 191, 192, 193, 513; 901/3, 4, 5, 15, 16; 73/862.05

[56] References Cited

U.S. PATENT DOCUMENTS

| | | | |
|---|---|---|---|
| 3,589,134 | 6/1971 | Hackmann | 364/190 X |
| 3,814,199 | 6/1974 | Jones | 250/229 |
| 4,046,005 | 9/1977 | Goroski | 73/862.05 |
| 4,055,787 | 10/1977 | Beadle et al. | 318/569 X |
| 4,146,924 | 3/1979 | Birk et al. | 901/16 X |
| 4,224,501 | 9/1980 | Lindblom et al. | 901/4 X |
| 4,283,764 | 8/1981 | Crum et al. | 364/513 |
| 4,378,959 | 4/1983 | Susnjara | 901/4 X |
| 4,424,559 | 1/1984 | Lorincz et al. | 364/131 |
| 4,481,592 | 11/1984 | Jacobs et al. | 901/3 X |
| 4,524,144 | 6/1985 | Kiyokawa | 364/171 |

OTHER PUBLICATIONS

"Robots Take a Hold on Production", *Metalworking Production*, Sep. 1982, pp. 122–129.
Hitachi Robot "Teaching Box" brochure.
ASEA Publications, CK09-1104E, A09-1003E, CK09-1102E, A09-1004E, CK09-1109E, CK09-1101E, CK09-1105E, CK09-1110E.

*Primary Examiner*—Jerry Smith
*Assistant Examiner*—Jon D. Grossman
*Attorney, Agent, or Firm*—Pollock, Vande Sande & Priddy

[57] ABSTRACT

A control system for a programmable industrial robot has a joystick for manual control of the robot during programming for teaching the robot to follow a working path defined by a number of set points. The control system further comprises a memory for storage of the coordinates of these set points and of other instructions and control members for control of the function of the control system during the programming and for storing or entering instructions in the memory. The control members comprise a group of control members each having a plurality of different functions, the particular function in question being determined by the prevailing condition of the control system. An indicating member is arranged, for each of the control members in the group, to indicate the current function of said control members.

8 Claims, 8 Drawing Sheets

CONTROL SYSTEM FOR AN INDUSTRIAL ROBOT

BACKGROUND OF THE INVENTION

This invention relates to a control system for an industrial robot of the kind comprising first control means for manually controlling the robot during a programming stage involving teaching the robot to follow an operating path defined by a number of set points; memory means for storing the coordinates of said set points as position instructions and other operating instructions which, together with said set points, define a work cycle of the robot; second control means for control of the control system during the programming stage and for storing or entering the said instructions; and means arranged, during automatic running of the robot, to control the robot in accordance with information stored in the memory means during the programming stage.

In a control system of the kind referred to, the robot, during programming, is run with the aid of the first control means—which can be manually influenced—successively to said number of set points which define the movement path or the operating positions that the robot is to follow or assume during automatic operation. These positions are stored in the form of a sequence of position instructions in a program memory, i.e. the memory means, present in the robot. In addition to the pure position instructions, other operating instructions are stored in the program memory giving further information about the working cycle of the robot. For example the operating instructions may give information about the desired robot velocity in a certain section of the movement, about control of outputs from the robot to external equipment, about the desired precision of the robot movement, about conditions for the robot movement in dependence on input signals from external sensors or equipments, about calls for pre-programmed subroutines, and so on. During automatic operation of the robot, the program instructions are run through successively, the robot is displaced successively between the different programmed positions in accordance with the position instructions and further carries out the measures which are programmed into the instructions.

The programming work is often carried out by the robot user, and it is therefore of great importance that the robot and its control system are so designed that the programming work can be carried out in a simple and fast manner by personnel who are not specially trained. In addition to the direct programming of position instructions and other instructions, the programming work includes changes of and other editing of already programmed instructions or programs, and it is of course of importance that this editing work can also be carried out in a simple and rapid manner.

Thus, during the programming stage the robot must first of all be manually displaced to each one of the set points or positions which define the desired robot movement. When a desired position has been assumed, information about the position is stored in the program memory by activating an operating or control member, for example a push button. The position transducers built into the robot are thereby read and the coordinates for the robot position are stored as a position instruction in the program memory of the robot. It is previously known to perform this position programming with the aid of the so-called play-back method, whereby the robot arm is gripped and moved manually along the desired movement path. When using this method, the servo-motors of the robots must, for safety reasons, be turned off, and the method is therefore only applicable to robots which are mechanically well balanced. Furthermore, for reasons which are easy to understand, the method cannot be employed with large robots. These and other reasons make the method only applicable in certain special cases, and it is not suitable for a robot which is intended for general application. It is also previously known to control robot movement during a programming phase by means of pushbuttons, for example two pushbuttons for each robot axis, whereby when depressing a button, the robot is displaced at an optional velocity (possibly an incremental distance) along the axis in question. However, it this method—especially for untrained operators—often involves considerable difficulties and the programming work therefore proceeds relatively slowly.

As mentioned above, during programming an operator must be able to program or influence a plurality of other functions of the control system. It is previously known to have, for this purpose, an operating unit with a so-called function-oriented key set. In such a key set, each key has a certain specified function which is clear from the text of the key. An operating unit of this kind therefore has advantages in the form of simple operation, and furthermore such an operating unit can be made compact and portable. However, with a reasonable number of pushbuttons it is only possible to realize a very limited number of functions in a compact and portable operating unit of this kind, and this considerably limits the applicability of such operating units. Admittedly it would be possible, with a given number of pushbuttons, to give each key or pushbutton a double or triple function, but in such case all advantages of the simplicity of operation would be lost.

It is also known to use, for programming of the different functions, a keyboard in combination with a visual display unit (VDU). During programming, the names and possible numerical values of the desired functions and other information are written out on the keyboard. The instruction in question, and possibly a number of additional instructions, can then be read on the VDU. This method is very flexible but has also considerable disadvantages First of all it is time-consuming, especially for an untrained operator, to write out the names of the different instructions with the aid of the keyboard. In the second place, a faulty entry on the keyboard gives rise to an error indication, and the instruction has to be repeated. In the third place, the operator must learn by heart the names of, and the spelling of, the different functions, or he must consult a handbook, during the programming work, which contains the names and correct abbreviations of the different functions. These facts contribute in making programming with this type of operating unit relatively slow. In the fourth place, for natural reasons the weight and dimensions of an operating unit of this kind will be so large that it must be positioned in a stationary manner, and then often at a relatively great distance from the robot. It will then be very difficult for an operator to manage the programming work.

The present invention aims to provide a control system for an industrial robot of the kind mentioned above, which makes it possible for an arbitrary user to carry out the programming work in a rapid and simple manner with a minimum of previous instruction.

SUMMARY OF THE INVENTION

According to the present invention there is provided a control system of the kind referred to wherein the first control means comprises a joystick for controlling the movement of the robot; the second control means comprises a group of control members, each having a plurality of different functions, the current function being determined by the prevailing operating state of the control system; and the control system further comprises indicating means arranged, for each control member in said group, to indicate the current function of said control member.

BRIEF DESCRIPTION OF THE DRAWINGS

Embodiments of the invention will now be described in greater detail, and by way of example, with reference to the accompanying drawings, in which.

DESCRIPTION OF THE PREFERRED EMBODIMENTS

Figure 1:
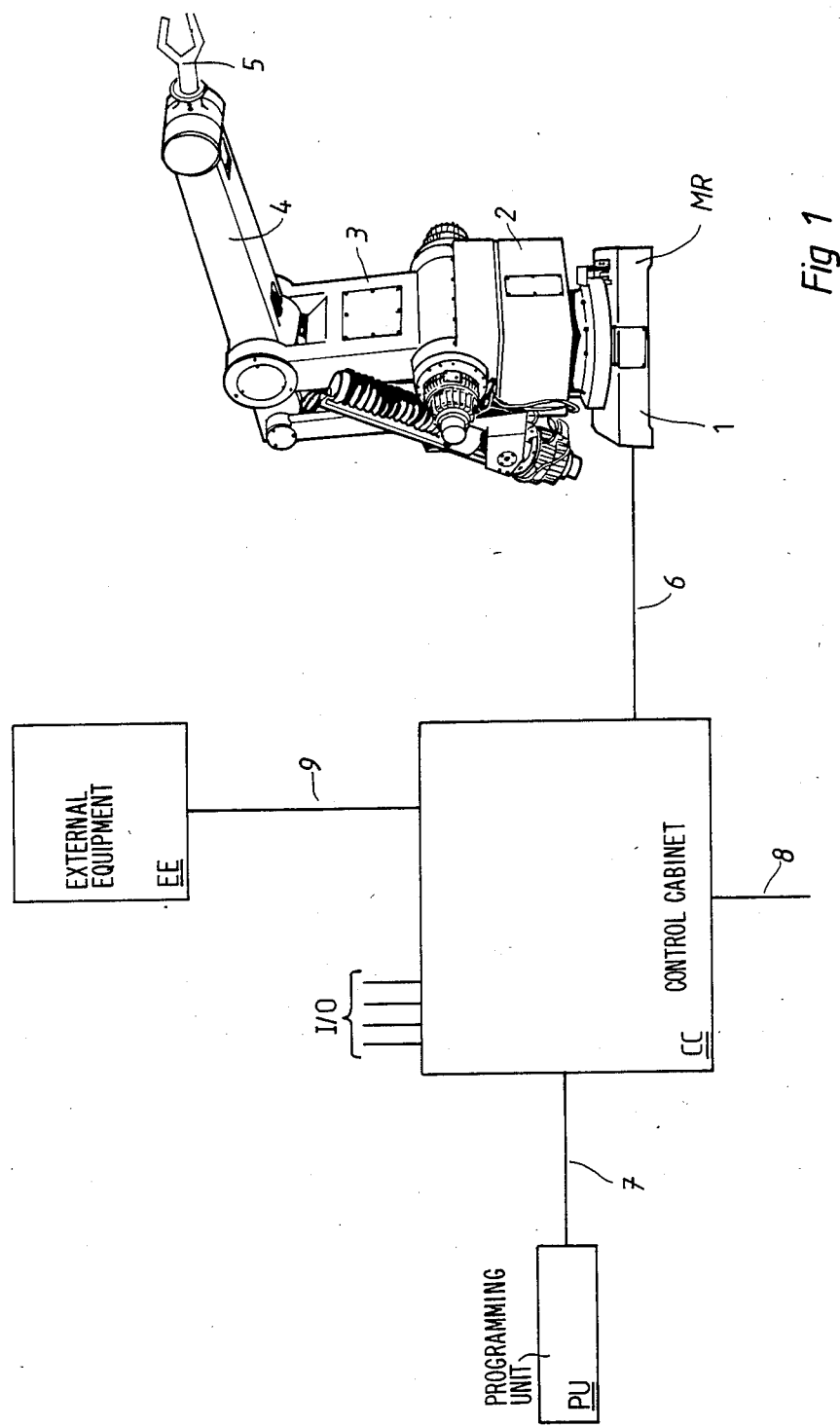
FIG. 1 shows a block diagram of a control system according to the invention for a programmable industrial robot.

FIG. 1 shows a robot control system comprising a mechanical robot part MR, a control cabinet CC, external equipment EE and a portable programming unit PU.

The robot comprises a fixed bottom plate 1 carrying a bottom portion 2 of the robot which is rotatable about a vertical axis relative to the plate 1. The robot further includes a lower arm 3, rotatable relative to the bottom portion 2 about a horizontal axis, an upper arm 4, rotatable relative to the lower arm 3 around a second horizontal axis, and a so-called hand, at the outer end of the upper arm 4, which is rotatable in, for example, two or three degrees of freedom relative to the arm 4. A working tool 5 is fixed to the robot hand, which tool may consist of a gripper (as schematically shown in FIG. 1) or alternatively of a machining tool, a welding equipment, a measuring tool, or the like.

The mechanical part MR of the robot is connected via a cable 6 to the control cabinet CC which houses electronic equipment and drive equipment required for controlling the mechanical part MR of the robot and any surrounding equipment. The control cabinet CC is connected via a cable 8 to an electric network (not shown) for power supply of the robot control system. Cable 9 connects the control cabinet CC to the external equipment EE controlled by the control system of the robot. This external equipment EE may, for example, typically comprise a rotating table, a conveyor belt, a feeding unit, or the like. The control cabinet CC can thereby include servo-systems for position and/or velocity control of motors present in the external equipment. Furthermore, the control cabinet can be provided with a number of inputs and outputs I/O. The inputs may be digital or analog and make it possible to connect sensors or other members to the control system for controlling the movement of the robot. For example, at a certain point of a robot control program, the continued work of the robot may be made dependent on the fact that a certain part is present at a certain position, which can then be sensed with the aid of a sensor connected to an input. Similarly, the outputs may be digital or analog and be used to activate, at a desired point in a robot program, certain external members. The separate portable programming unit PU is connected to the control cabinet CC via a cable 7. Communication between an operator and the control system takes place via this programming unit PU and via a control panel included in the control cabinet. The control cabinet CC has a compartment in which the programming unit PU can be placed when it is not used.

Figure 2:
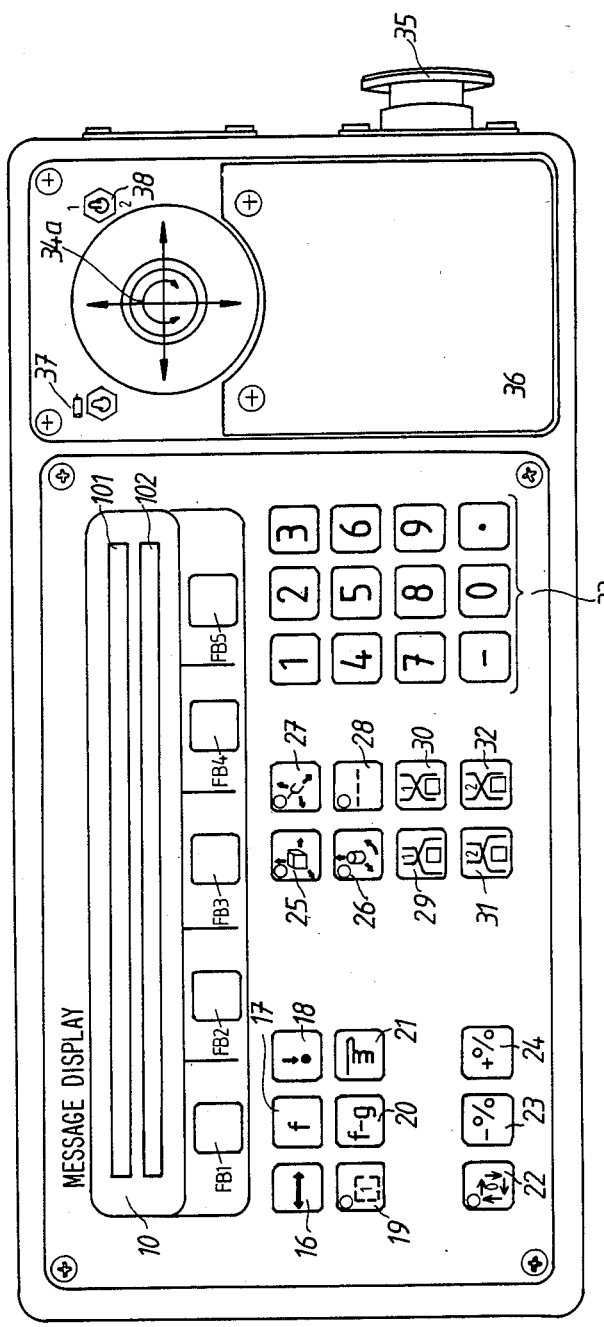
FIG. 2 shows a control panel of a programming unit of the control system shown in FIG. 1.

FIG. 2 shows the control panel of the programming unit PU. On the righthand (as viewed in FIG. 2) part of the unit PU there is a joystick 34, the longitudinal axis of which is perpendicular to the plane of its support. At the upper end of the joystick there is a rotatable knob 34a. By displacing the joystick in the longitudinal direction, in the lateral direction and by rotating the knob 34a, the movement of the robot can be influenced in three degrees of freedom, as shown by the arrows in FIG. 2. Furthermore, the righthand part of the unit PU includes an emergency stop pushbutton 35, and a safety plate 36, on which the operator's hand rests when operating the joystick by means of the fingers. When the hand is removed, the safety plate senses this fact and influences the control system so that the joystick is made inactive. In this way any inadvertent contact with the joystick does not give rise to a movement of the robot. By means of a switch 37, it is possible to select whether the joystick is to influence the movement of the robot or (in the position shown) the movement or position of an external unit, for example a rotating table controlled from a servo-system of the robot. A switch 38 determines whether the joystick is to influence the position of the working point of the robot or the orientation of the robot hand. In the position shown in FIG. 2, the joystick determines the position of the working point of the robot, which working point is a point with a fixed position in relation to the robot hand, for example the end of a machining tool fixed in the robot hand. The position of this point is influenced with the aid of the joystick, whereby the orientation of the hand in space is maintained unchanged. In the other position of the switch 38, the control lever determines the orientation of the robot hand, whereby the position in space of the working point of the robot is maintained constant.

As a result of extensive trials and much consideration, it has proved to be of great importance how the joystick of the robot and its influence on the robot movement are designed. It has been found that by far the simplest and fastest programming is obtained if the joystick is given the following characteristics:

(a) The joystick is returned to its neutral position by resilient members, a certain minimum force being required to displace the joystick (including the knob 34a) from its neutral position.

(b) The velocity of the robot movement is determined by the deflection of the joystick from its neutral position in each axis.

It has proved that with a joystick having these properties unskilled operators can directly and rapidly control the robot to the desired position.

On the upper lefthand (as viewed in FIG. 2) part of the programming unit there is arranged a two row (101, 102) information table or presentation unit 10 in the form of an alphanumeric "fluorescent" display. Each row 101, 102 may simultaneously display up to 40 alphanumeric symbols. For the upper row 101 the following applies:

If a message consists of more than 40 characters, the message is divided so that the first 40 characters are shown simultaneously and the remaining characters are shown when a shift key 16 is pressed, which can be repeated several times.

Return to the first part of the message takes place when the shift key 16 is again pressed after the last part of the message has been viewed or when a control key is pressed.

Dialogue between the operator and the robot control system takes place via text on the lower row 102 and function keys FB1-FB5. The lower row 102 displays information about, for example, the significance of the function keys, alternative choices, and questions and requests for different data. The upper table row 101 displays, for example, the current instruction in the robot program.

The function keys FB1-FB5 may have different functions depending on which working condition the robot is presently at. In the following description these keys are therefore referred to as "variable function" keys, control keys, or pushbuttons. The programming unit PU is further provided with a number of function keys 17-32 each with a constant function, and in the following description these keys are referred to as "fixed function" keys, control keys, or pushbuttons. Furthermore the programming unit PU includes a key set 33 for storing numerical data in the robot program, for example for definition of the speed of displacement of the robot, of an idle time, or a positional displacement, or the like.

With the aid of the five fixed function pushbuttons 17-21, five different basic states for the control system can be selected. When selecting one of these basic states, the variable function pushbuttons are assigned certain specified functions (different for each basic state), which will be clear from the text appearing immediately above each key FB1-FB5 in the lower table row 102. In a certain basic state there can either be selected, with the aid of the variable function pushbuttons, a sub-state in which the function pushbuttons have additional, different functions, or there may be programmed into the program memory specified functions, which will be apparent from the text appearing above each key. This will be described in greater detail hereinafter.

The key 22 is a "stop" key which stops the execution of programs and thus the movement of the robot. With the aid of the keys 23 and 24, the speed of movement of the robot, also during automatic running, can be incrementally changed in relation to the programmed velocity, for example in increments of 5% of the programmed velocity. The keys 25-27 enable the selection of different types of displacement of the robot under the control of the joystick and in particular enable the selection of the appropriate system of coordinates for the selected displacement. Thus with the aid of the key 25, a perpendicular, fixed system of coordinates (cartesian coordinates) is selected, with the aid of key 26 a fixed cylindrical system of coordinates is selected, and with the aid of key 27 a so-called hand coordinate system is selected, which assumes a fixed position in relation to the robot hand. Depending on the current task of the robot, a considerable simplification of the robot displacement can be obtained if a suitable system of coordinates is chosen and, accordingly, a simpler and faster programming. When pressing the key 28, the joystick will receive a different function from the velocity-controlling function described above. With this key 28 pressed, each movement of the joystick in a certain direction gives rise to a displacement of the robot by a predetermined increment, for example 0.1 mm in the given direction, whereby to enable fine adjustment of the robot to the desired position to be made in a simple and accurate manner. With the aid of the keys 29, 30 and 31, 32, two different grippers arranged on the robot hand can be controlled to open and close, respectively.

The various pushbuttons arranged on the panel of the programming unit may suitably be of so-called contact-free type (touch contacts), since this enables the construction of a light, thin and compact panel. It will be appreciated that the use of the term "depression" in relation to a key or pushbutton in this specification is intended to cover the touch operation of such touch contacts although actual movements of the key or pushbutton will in this case be minimal.

Figure 3:
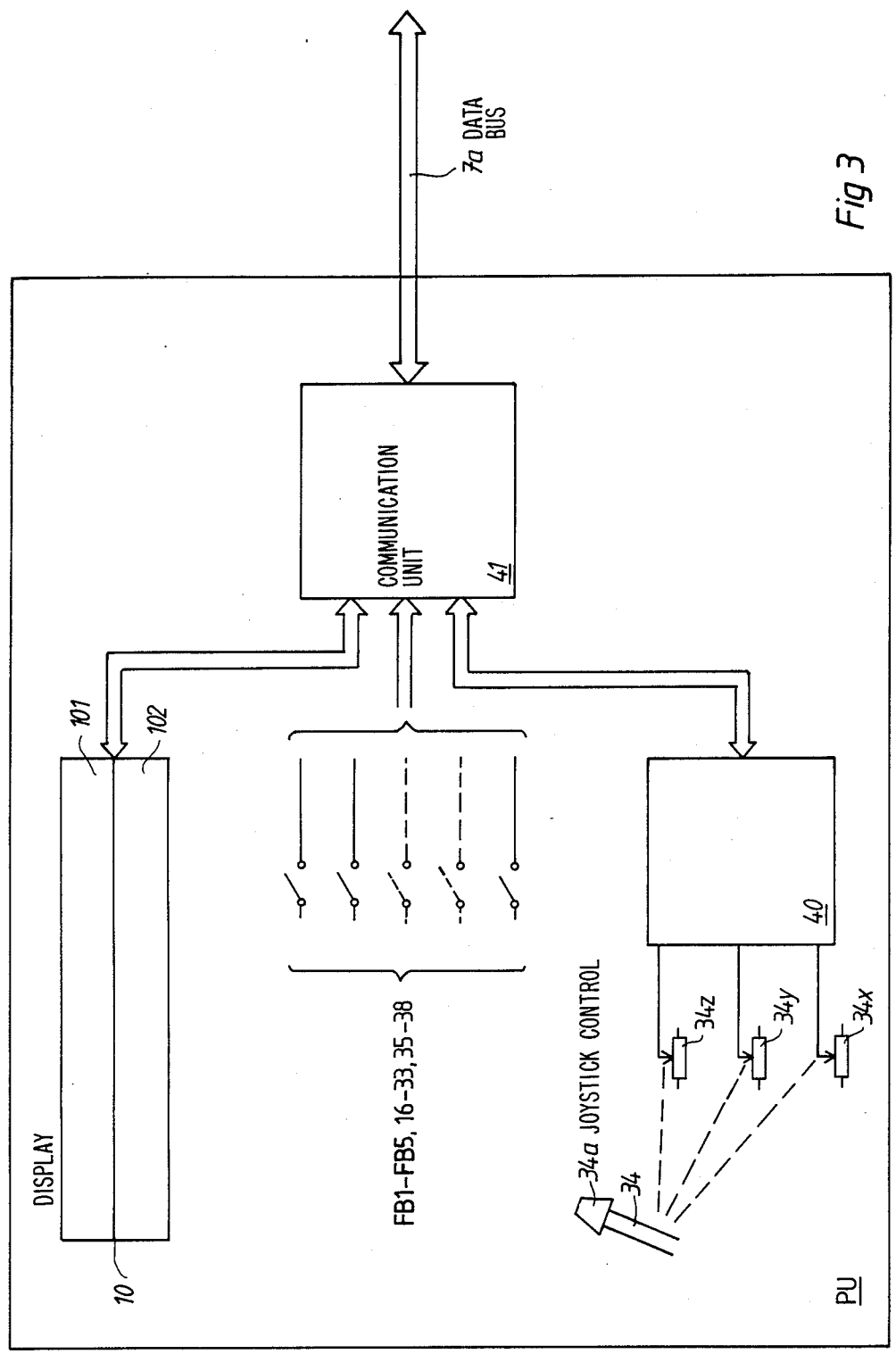
FIG. 3 shows a block diagram of the programming unit shown in FIG. 2.

FIG. 3 shows a block diagram of the programming unit PU. The joystick 34 with the rotatable knob 34a includes three transducers 34x, 34y and 34z, for example potentiometers, which sense the deflection of the joystick. The joystick deflection is converted in a unit 40 into digital signals. The different pushbuttons and switches FB1-FB5, 16-33, 35-38 of the unit are only schematically shown in FIG. 3. A communication unit 41, for example a microprocessor, is arranged to sense the current positions of the pushbuttons and switches and the joystick deflections, and to forward this information to the control cabinet CC via a databus 7a, for example in series form. The communication unit 41 also receives, via the databus 7a, information about the desired current text for the presentation unit 10 and forwards this in the form of suitable control signals to the presentation unit.

Figure 4:
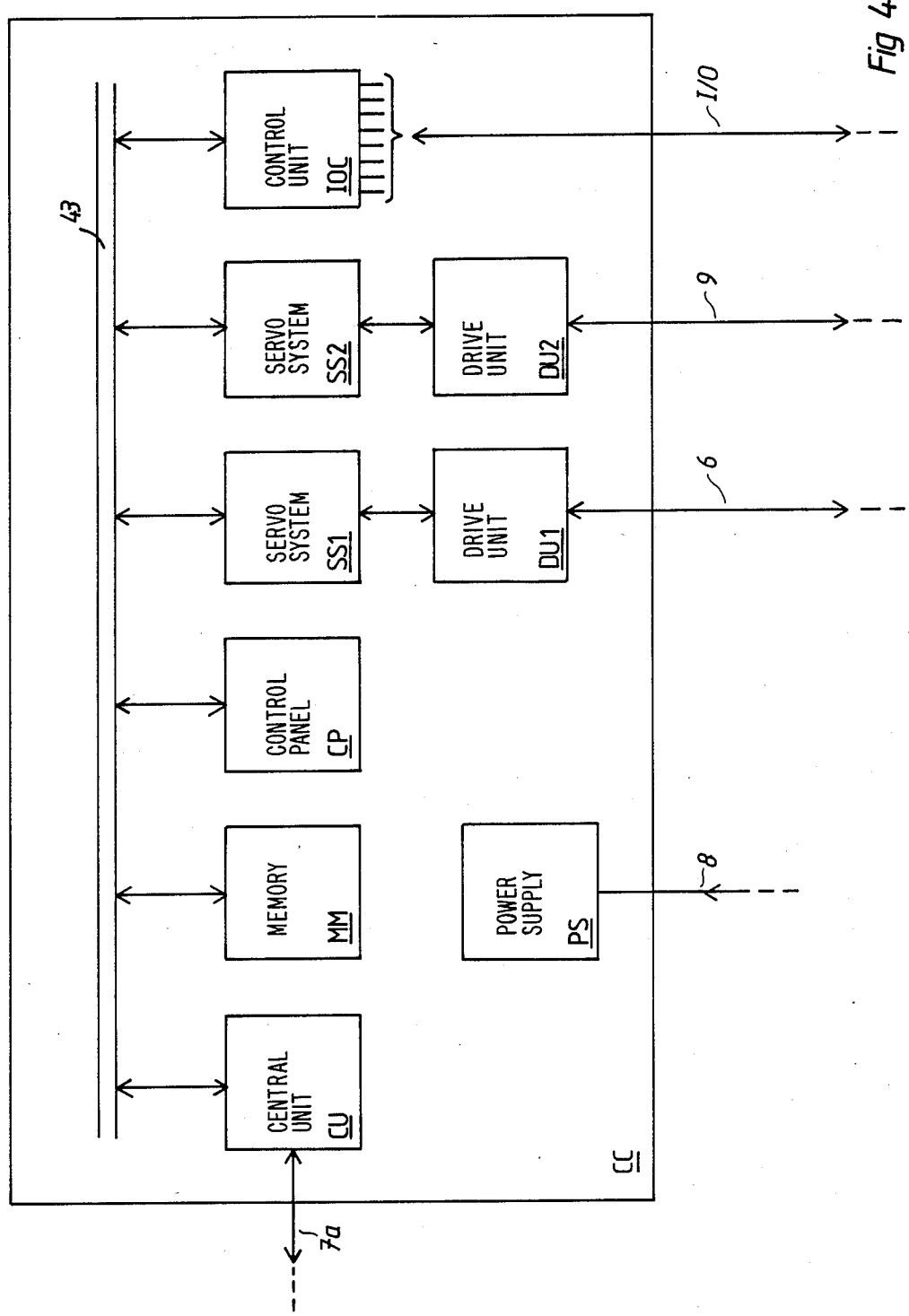
FIG. 4 shows a block diagram of a control cabinet of the control system shown in FIG. 1.

FIG. 4 shows a block diagram of the control cabinet CC. It comprises a central unit CU, consisting of a microprocessor, which communicates with the programming unit PU via the communication link 7a and with other units within the control cabinet via a databus 43. All information necessary for the operation of the robot is stored in memory members MM. The memory contains on the one hand a so-called control memory, for example consisting of PROMs, in which general information necessary for the operation of the robot is stored, for example coordinate transformations. The memory members MM further comprise a user's memory, in which the user for each operating case stores the positioning instructions and other instructions defining the working cycle of the robot. The user memory may consist of a so-called semiconductor memory with battery backup. The control cabinet further contains a control panel CP which has the functions required for starting up the control system, for starting and stopping the robot, for emergency stop of the system, and possibly also for communication with a mass memory, for example a floppy disc memory. A servosystem SS1 receives from the different axes of the robot information about the position and possibly also the velocity, compares these with reference values which are obtainable from the program of the robot stored in the memory, or from the programming unit, and controls via a drive device DU1 the drive motors of the robot axes. In a corresponding manner, a servo system SS2 and a drive unit DU2 are arranged for control of the external equipment EE. A control unit IOC communicates with the inputs and outputs I/O of the control system. It comprises necessary members for sensing of and possibly analog-digital conversion of the input signals and for control of the signals on the outputs and for necessary digital-analog conversion. The control cabinet CC finally includes a power supply unit PS, which supplies the different parts of the system with the necessary supply voltages.

The design of the programming unit PU is based on the principle of "self instructing operator communication". This implies that the functions of the variable function pushbuttons FB1–FB5 are controlled by the system and presented in plain text on the presentation unit, and this in such a way that the operator at each moment is informed about what measures are permitted. In the following those parts of the control system which are concerned with, and which control, the function pushbuttons will be described in greater detail.

Figure 5:
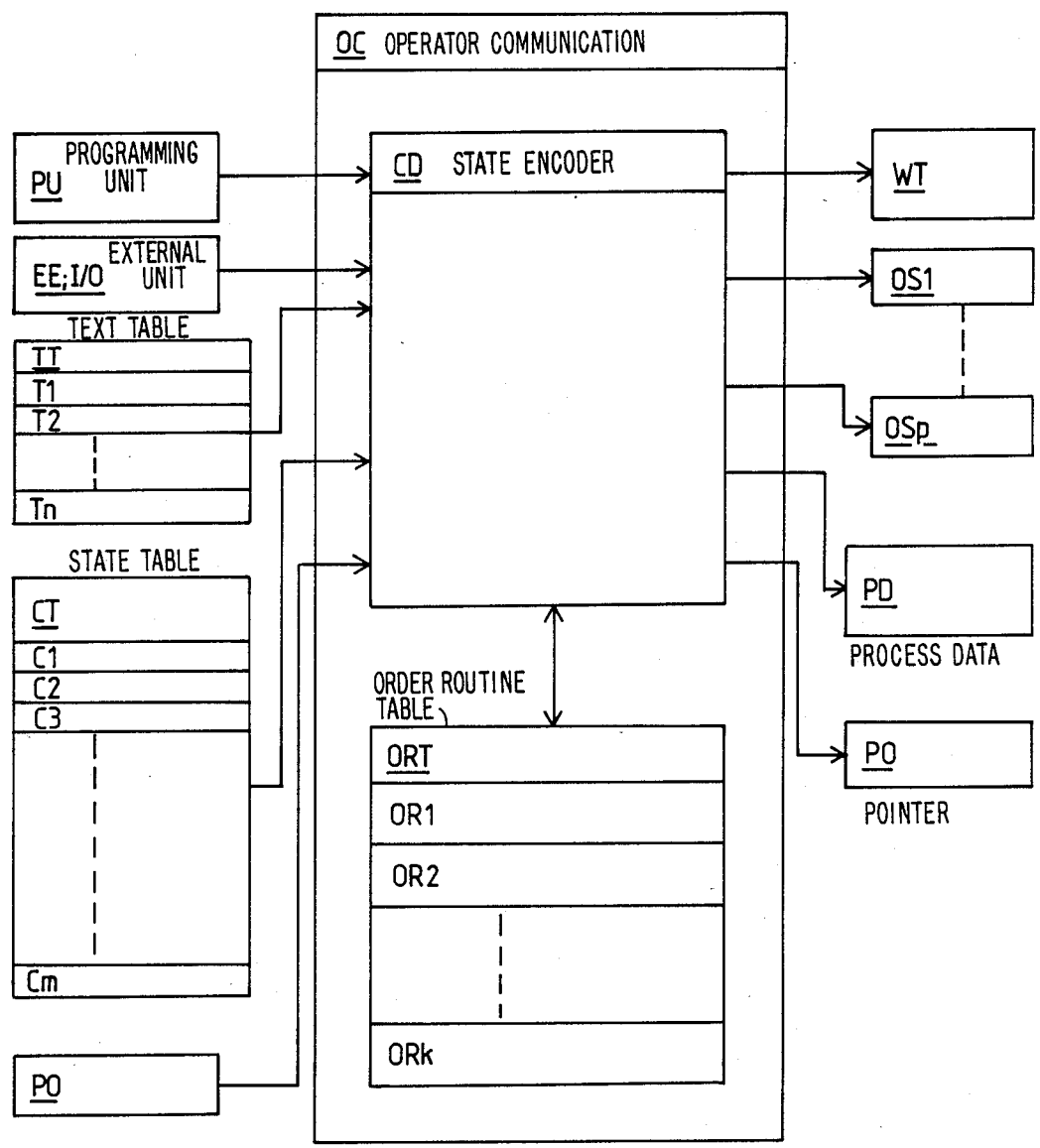
FIG. 5 shows the structure of those parts of the control system, shown in FIG. 1, which perform the selection of a desired function.

As shown in FIG. 5, the control system comprises a unit OC for operator communication including a state encoder CD and a table ORT of order routines. Furthermore, a text table TT and a state table CT are stored in the system. The text table TT stores all text that the system needs, i.e. instruction texts, programming auxiliary texts, function pushbutton texts and error messages. The state table CT contains, for each one of the possible states of the system, information about the function of each of the variable function pushbuttons, i.e. about what measures are to be taken by the system in response to activation of a certain function pushbutton and further what state is to be assumed by the system after the orders have been executed. The table ORT of order routines contains detailed information about different order routines. The unit OC for operator communication receives input signals from the programming unit PU as to what function pushbuttons are to be activated, and from the external equipment EE and inputs I/O about input signals from external equipment or process equipment, i.e. so-called process signals. The unit OC controls a function block WT which supplies information to the programming unit PU about the current text on the presentation unit 10. The unit OC also supplies a number (p) of order signals $OS_1$–$OS_p$ to the executing members of the system and process data PD for control of the external equipment. The unit OC is controlled by and delivers a pointer PO, the function of which will be described below.

Each time that the text and the pushbutton-controlled functions are changed, the system is said to assume a new state. In connection with a new state being assumed, for example in response to depression of a pushbutton, a number of orders are also executed, for example "start of program execution". These operations are administered by the state encoder CD which receives input signals from the programming unit and process signals and thereby receives information about which operating or control members have been influenced or which process signals have been changed. These input signals are compared with data stored in the state table in that place which is defined by the active state. By the "active state" is meant the presently prevailing state of the system and is indicated by the special pointer PO. If the input signal is permitted in the active state, which will be clear from the state table, a state change is carried out. This implies the following:

(a) A number of orders are executed by calling order routines in the order routine table ORT. Thereby a number of order signals can be transmitted to other parts of the system, or process data PD be changed. Which order routines to be called will be clear from data in the state table.

(b) The next stage becomes active, whereby the pointer PO is given a new value, which will be clear from data in the state table which indicates the next state.

(c) A new text is laid out at the lower part of the presentation unit, which text indicates the new function of the function pushbuttons. These texts are fetched from the text table TT and are indicated by data in the state table. The text is laid out via a signal WT supplied to the programming unit PU.

Figure 6:
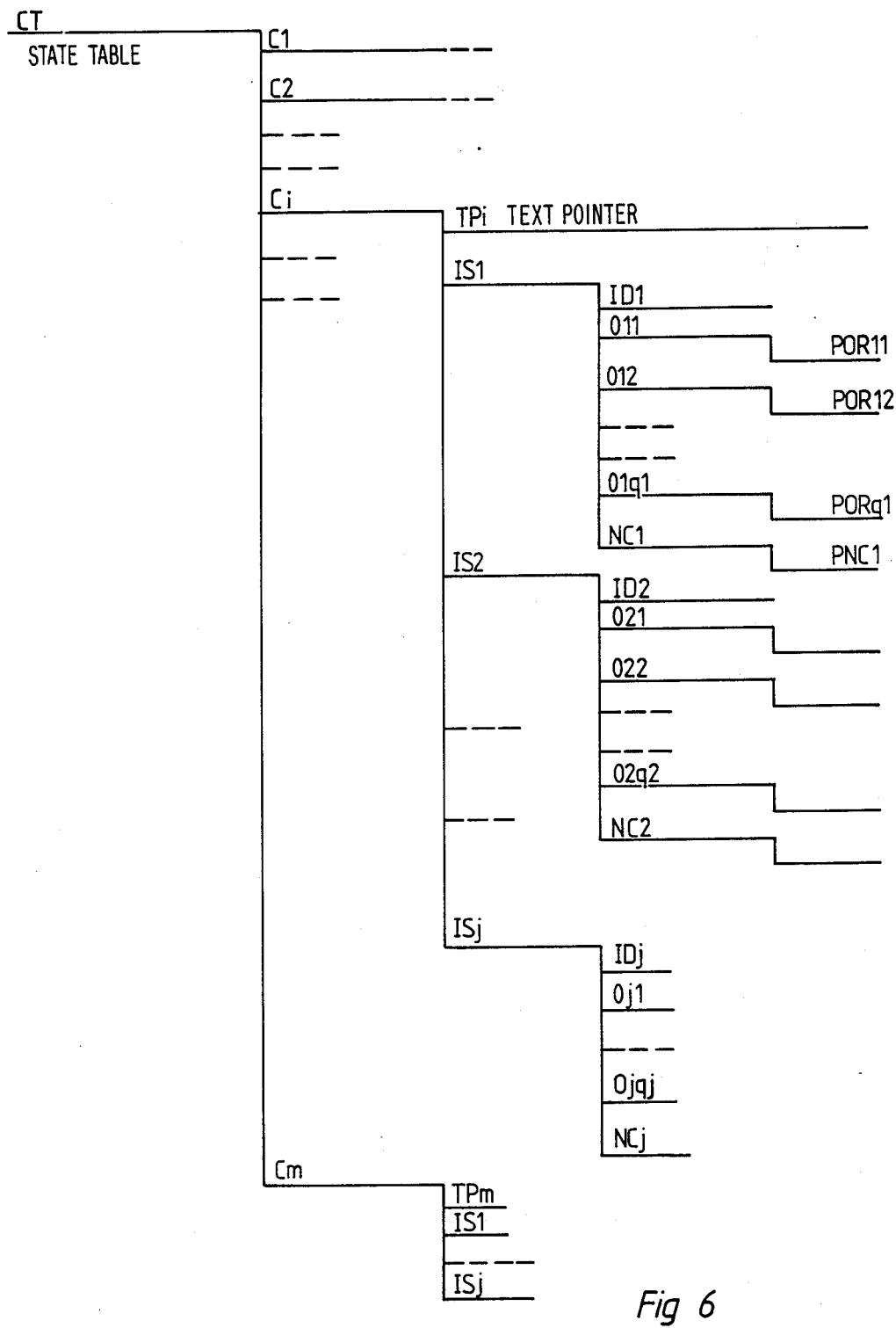
FIG. 6 is a diagram illustrating the function of the control system shown in FIG. 1 when selecting functions.
Figure 7:
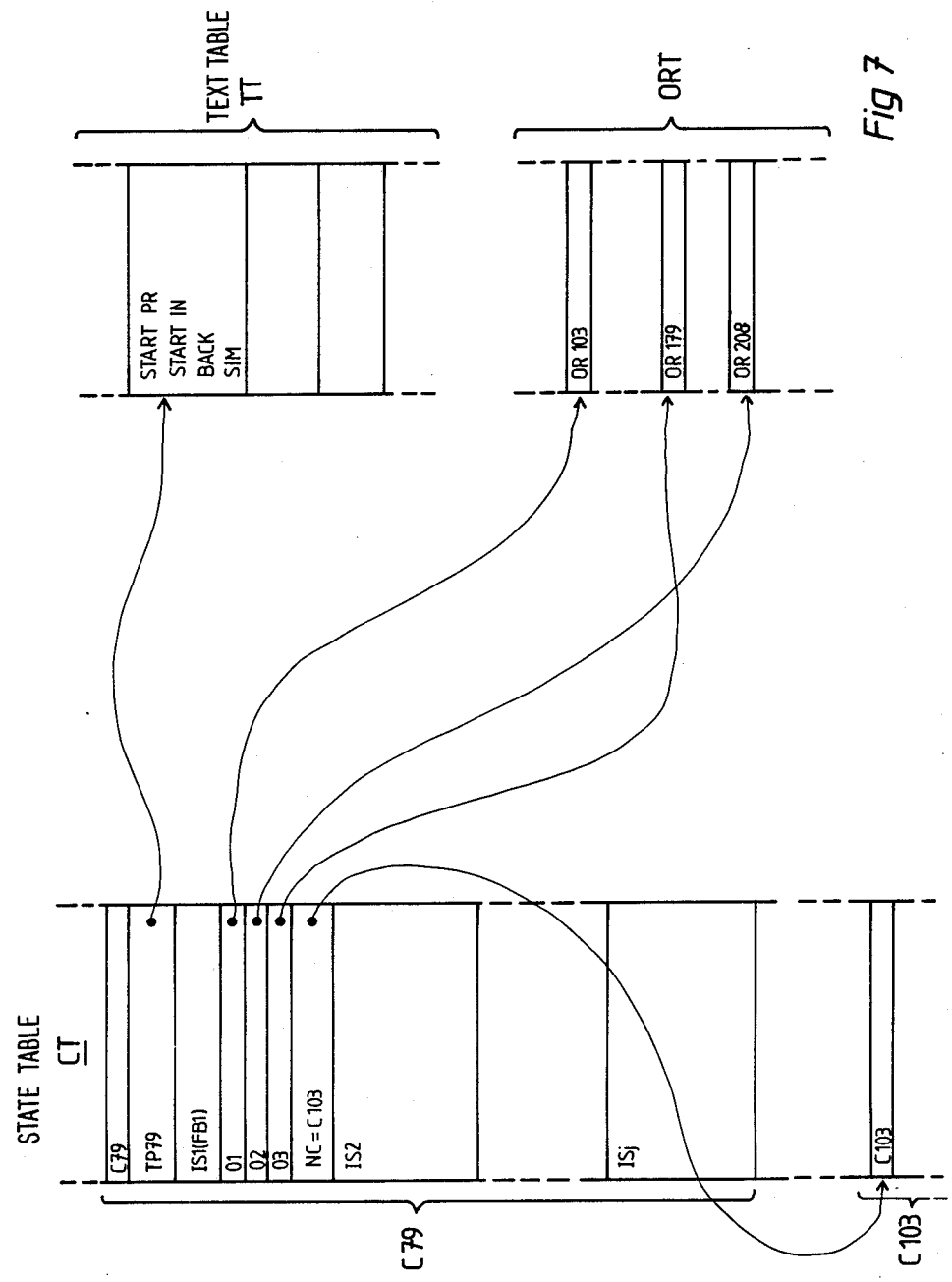
FIG. 7 shows an example of the execution of a function selection.

The actual program logic, i.e. the answers, to questions of the type "what happens if key x is pressed when the robot is in state y?" is thus incorporated in the state table CT. The structure of a field or a state in table CT is clear from FIG. 6. The system is considered to be able to assume m different states, and the state table therefore contains m fields, designated C1–Cm. The field in the state table which corresponds to the state Ci is shown in more detail than the other fields which are only indicated generally. From FIG. 6 it will be clear that a number j of input signals are permitted in state Ci. Other input signals are ignored or give rise to error states. A permitted input signal is identified by means of an identity stored in the state table. When the system enters into state Ci, a text pointer TPi is first delivered. This text pointer addresses the position in the text table TT in which the text for the current state referring to the variable function pushbuttons is stored, and this text is written out on the presentation unit PU. An input signal, for example IS1, which may, for example, consist of a pressing of the function pushbutton FB1, gives rise to an identity comparison, as mentioned, which in FIG. 6 is marked ID1. The state table contains a list of the orders, 011-01q1, which are to be executed in response to the pressing of the pushbutton FB1. In the proper order, pointers POR11-PORq1 are delivered which address the order routine table ORT, in which detailed information about the signals to be delivered for each order is stored. The state table CT also contains information, NC1, which identifies which state the system shall enter into when all the orders have been executed, which constitute a response to the input signal in IS1. When these orders have been executed, therefore, a pointer PNC1 is delivered, which points out or addresses the field in the state table which corresponds to the next state of the system. The process will be described further with reference to FIG. 7, the lefthand part of which shows a section of the state table CT and the right-hand part a section of the text table TT and the order routine table ORT. The system is considered to enter into the state designated C79. First there is delivered a text pointer, stored in the state table, which addresses the text table TT. As an example it is assumed that, for the state 79, the function pushbuttons FB1–FB4 have the following text:

| | |
|---|---|
| START PR | (start program) |
| START IN | (start instruction) |
| BACK | (run backwards) |
| SIM | (simulate conditions) |

Via the unit WT these texts are then presented above the corresponding function pushbuttons. Thereafter, if, for example, the input signal IS1 is received in response to a pressing of the function pushbutton FB1, this signal is first compared in the state encoder with the identity stored in the state table under IS1. Since the function pushbutton FB1 has been pressed, the procedure cintinues in the state table and the orders 01–03 which are defined in the state table under the input signal IS1 are carried out in the proper order. For each order, the state table contains a pointer which addresses the position in the order routine table ORT where detailed information about the order is stored. As will be clear from FIG. 7, in the example the order 01 is assumed to imply that the field OR103 in the order routine table is addressed, the order 02 addresses the field OR208 in the order routine table and the order 03 implies that the field OR179 is addressed. When all the orders in the state table under IS1 are executed, the information NC=C103, which defines the next state, in this case the state C103, is read. A pointer to the field C103 from the state table is obtained and the system is now in the new state, new texts above the function pushbuttons are fed out, and so on.

In the following there will be described in more detail an example of how to perform the selection of functions in a control system according to the invention. The fixed function pushbuttons 17–21 are called control pushbuttons in the following. What type of functions are to be found below the respective control pushbutton will be clear from the following table:

| Pushbutton No. | Designation | Function type |
|---|---|---|
| 18 | POS | Generation of positioning instructions |
| 17 | INST | Generation of other instructions |
| 20 | RED | Editing of programs and instructions |
| 21 | MAN | Manual system handling |
| 19 | AUTO | Control of program running |

The procedure is the same when it comes to entering program instructions, editing instructions and programs, or input of system data. The communication between the operator and the robot system takes place in dialogue form. Guiding text is shown on the lower row 102 of the presentation unit 10.

During communication with the robot system, the upper row of the unit 10 will show:
1. Guiding text of importance for the continued dialogue between the operator and the robot system.
2. Instruction number and instruction or part of instruction including arguments.
3. All types of error messages.

The lower row of the unit 10 is used for feeding out the reaction of the robot system to the actions taken by the operator during the dialogue.

The following presentations may occur:
1. Selection of four alternative functions as well as a function (SCAN) which makes it possible to call forward further instructions ("leaf-through" function).
2. Selection of up to four alternative partial functions which are subordinate to the functions stated in the preceding paragraph.
3. Questions with the response alternatives "Yes" or "No".
4. Questions requiring input of data from the digital key set as well as the functions ENTER and CLEAR.

The selection of the desired function or partial function takes place by pressing the function pushbutton which is located immediately below the text indicating the desired function. At any time it is possible to interrupt the selected functions or partial function by pressing any of the control buttons POS, INST, RED, MAN or AUTO.

If a function pushbutton without any accompanying text is pressed, this is ignored by the system.

The following paragraphs describe how the operator proceeds when the different system transcriptions are displayed on the lower table row of the programming unit.

Figure 8:
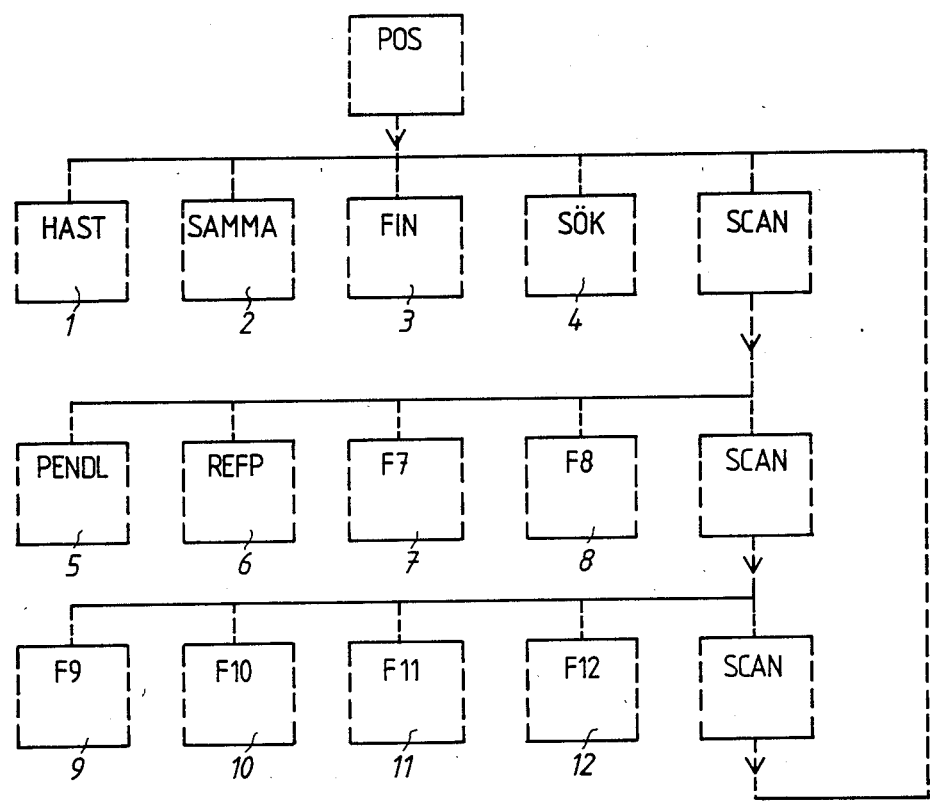
FIG. 8 is a block diagram showing an example of a function selection.

When the control button POS, according to the abovementioned table, is pressed, the lower row 102 of the presentation unit 10 shows a transcription according to the upper row of FIG. 8.

Now the operator can do as follows:
1. Select any of the functions 1-4
2. Call in further functions by pressing the function pushbutton which is located immediately below the table text SCAN. When the text for the desired function is displayed on the table, the corresponding function pushbutton is pressed.

With the SCAN function, the functions can be "leafed" through. When all the functions have been displayed, the next depression of the SCAN pushbutton will cause the first shown function texts to return. This can proceed until:
1. The operator selects a function.
2. The operator again presses the control pushbutton (POS) under which the functions belong, or any other control pushbutton. After pressing a control pushbutton, the first four function types are always shown.

When a function has been selected according to the above procedure, the system is able to react by demanding further information. How the operator stores this information will be described hereinafter.

By displaying up to four alternative partial functions on the table, the system can demand further information. In this position, there is no SCAN possibility.

Further information can also be requested by the system by presenting a question on the text table. One of the function pushbuttons FB1–FB4 will then receive the guiding text YES and another of the pushbuttons the text NO. The question is answered either by pressing the YES or the NO pushbutton.

In certain positions, the system demands further information which is to be entered in digital form. In that case the digit key set is used. The lower row of the unit 10 then displays DATA=, and two of the pushbuttons FB1–FB4 receive the guiding texts ENTER and CLEAR, respectively.

DATA symbolizes the quantity which requires digital data. If, for example, the figure -8.02 is to be stored, this takes place in the order from left to right. As the characters are registered, they are shown in the field on the right of DATA=. When the operator is convinced that the stated numerical value is correct, the ENTER pushbutton is pressed. Otherwise, the CLEAR push button is pressed, and the registered numerical value disappears and a new input of figures can start.

The significance of the different guiding texts in FIG. 8 will be clear from the following description.

HAST (VELOCITY):

Storing of velocity as a percentage of a basic velocity defined in advance. Storing of velocity in an instruction is performed as follows:
1. Press the function pushbutton HAST (VELOCITY)
2. Write the desired percentage (0.1-800%) of the current basic velocity using the digit key set.
3. Press the function pushbutton ENTER.

SAMMA (SAME):

The function SAMMA is used when several positioning instructions follow immediately one after the other and it is desired that the same arguments shall apply to all.

When pressing down SAMMA the argument which referred to the immediately preceding positioning instruction will be repeated for the current position which is to be programmed. After pressing SAMMA, the upper row of the table shows the current instruction with all the valid arguments. The lower row is emptied of text. The programming of the instruction is thus completed, and further arguments cannot be stored for this instruction.

FIN (FINE):

The argument FIN is used when, in a program, it is desired that the robot be positioned accurately. It is possible to choose two degrees of accuracy by stating a large or a small zero zone. A large zero zone reduces the accuracy.

Storage of the argument FIN is made as follows:
1. Press the function pushbutton FIN
2. If a small zero zone is desired, press the NO pushbutton. Large zero zone is automatically obtained when pressing FIN.

If the argument FIN is not used in a positioning instruction, no zero zone is specified. The programmed position is called coarse point.

SÖK (SEARCH):

This is used, for example, when the movement of the robot is to be interrupted in case of a signal on an input. When pressing don this function pushbutton, new guiding texts are obtained, and with the aid of the function pushbuttons the input can then be specified and the conditions for the interruptions be defined.

PENDL (OSCILLATION):

The argument PENDL is used when the robot is to carry out a movement pattern while at the same time the main movement is a rectilinear displacement between two points.

The movement pattern will previously have been defined in a sub-program with a certain number. This sub-program is called an oscillation program. In connection with programming of the end point of the rectilinear displacement, the oscillation program will be superimposed by the end point.

Storage of the argument PENDL is carried out as follows:
1. Press the function pushbutton SCAN
2. Press the function pushbutton PENDL
3. Enter the desired oscillation program number (1-999) using the digit key set.
4. Press the function pushbutton ENTER.

REFP:

The function REFP (REFERENCE POINT) is used when it is desired that a movement pattern shall be parallel-displaced within the operating range of the robot.

All the positioning instructions between the instructions with the arguments REFP ON and REFP OFF (or RETURN) will be carried out in relation to the position of the robot when the instruction containing the argument REFP ON is executed.

The reference point is programmed as follows:
1. Press the function pushbutton SCAN
2. Press the function pushbutton REFP
3. Press the function pushbutton ON The movement pattern, which is to be parallel-displaced, is terminated by the argument REFP OFF being used for a positioning instruction. The robot is displaced to the last position in the movement pattern, and this position is stored as an ordinary positioning instruction. When this is done, the POS pushbutton is pressed again, with the robot in the same position. Thereafter, the following is done:
1. Press the function pushbutton SCAN
2. Press the function pushbutton REFP
3. Press the function pushbutton OFF As will be clear from FIG. 8, further functions and guiding texts F7-F12 may occur under the group of functions which are chosen with the aid of the control pushbutton POS. The number of functions in this group may be arbitrarily great If the number of functions is five or lower, the function pushbutton FB5 may be given a certain function instead of the SCAN function shown in connection with FIG. 8.

Under the control pushbutton INST there are, in a corresponding manner, a number of functions by which instructions are built up which do not involve axial movements.

What is influenced by these functions are:
1. The sequence in which instructions, program sections or programs are carried out.
2. Communication between the robot system and the external equipment.
3. Certain conditions for the mode of operation of the robot axes.

If a fault is discovered in the program, this should of course be corrected. Also it must be possible to carry out supplementations and other alterations of an already completed program. To accomplish this, there are provided editing functions under the editing control pushbutton RED.

Under the control pushbutton MAN there are a number of functions by which the mode of operation of the robot system can be manually influenced, for example storage of programs from a floppy disc, setting of output signals, etc..

Under the control pushbutton AUTO 1, there are a number of functions by which programmed running of the robot can be carried out.

The foregoing description has shown how some of the function pushbuttons (17-32) have a constant or fixed function, whereas other pushbuttons (FB1-FB5) have a variable function. The control pushbuttons 17-21 are used for selection of a function group (E.G. POS), whereas the other fixed pushbuttons 22-32 have specified functions. Some of or all of the function pushbuttons 22-32 could, of course, be omitted, in which case the functions of the pushbuttons would instead be included in the "menu" which is obtained with the aid of the function pushbuttons 17-21. In a corresponding way, certain of the functions occurring in the "menu" could be removed therefrom and be assigned fixed pushbuttons in addition to those shown in FIG. 2. In the same way, the number of control pushbuttons could be made greater or smaller, whereby with an unchanged total number of functions the number of functions below each control pushbutton would be smaller or greater, respectively. In an extreme case all the control pushbuttons could be omitted and their functions instead be assumed by the variable function pushbuttons FB1-FB5. The five control pushbuttons 17-21 could then be replaced by one single pushbutton which, when pressed, assigned the function of the control pushbuttons to the function pushbuttons FB1-FB5. The two contradictory demands for, on the one hand, a small number of pushbuttons on the programming unit and, on the other hand, a small number of necessary depressions of pushbuttons to achieve and carry out a certain function require a suitable compromise. In this connection, the embodiment described above has proved to be exceedingly suitable and to permit a simple and fast programming.

As will be clear from the above description, the control system according to the invention combines the possibilities of a fast, simple—and thereby reliable —positioning of the robot by means of the joystick with a method of programming the robot which enables the operator to be guided towards a correct programming using a minimum of pushbuttons and without the need for consulting handbooks or the like. Further, a programming unit according to the invention can be extended, without alterations, by an unlimited number of new or changed programming functions. A further, important advantage is that the programming unit, by a simple reprogramming of the text table, can be changed to give guiding texts in any arbitrary language. Alternatively, guiding texts in several different languages can be stored into the text table, whereby the supplier or the user, for example with the aid of a function pushbutton or another operating member, selects for each occasion the desired language of the guiding texts and other information on the presentation unit.

The embodiments of the invention specifically described above are example only and it will be appreciated that many modifications may be made thereto within the scope of the following claims.

What is claimed is:

1. In a control system for a programmable industrial robot comprising:
   first control means for manually controlling the robot during a programming stage for teaching the robot to follow an operating path defined by a number of set points;
   memory means for storing coordinates of said set points as position instructions and storing other operating instructions which, together with said set points, define a work cycle of the robot;
   second control means for control of the control system during the programming stage and for entering said instructions, and program means for controlling the robot during automatic running of the robot in accordance with information stored in the memory means during the programming stage;
   said first and second control means being arranged in a portable programming unit, which is connected to other parts of the control system by means of a communication channel;
   the improvement wherein;
   the first control means comprises a joystick for controlling movement of the robot;
   the second control means comprises a group of control members, each capable of a plurality of different functions, the function of each control member being determined by the prevailing operating state of the control system; and
   the control system further comprising indicating means which, for each control member in said group, indicates the current function of said control member;
   said indicating means arranged in said programming unit;
   the control system further comprising a state table stored in advance in the memory means, which table for each of the operating states that the system may assume containing information which defines:
   (a) the current function of each one of the control members in said group for presentation with the indicating means, and
   (b) for each one of the control members, the orders to be carried out by the control system in the current state upon activation of the control member, and the new state the system shall assume after execution of the orders;
   whereby the control system, upon activation of a control member, executes said orders and subsequently presents the functions of the control members in the new state on the indicating means.

2. A control system according to claim 1, comprising joystick mounting means enabling the joystick to be movable in at least three degrees of freedom for controlling movement of the robot in at least three separate directions.

3. A control system according to claim 2, wherein the joystick, or part thereof, is capable of rotation around a longitudinal axis of the joystick for controlling the robot in one of said degrees of freedom.

4. A control system according to claim 1 wherein the velocity of a movement of the robot is determined by the deflection of the joystick from a neutral position.

5. A control system according to claim 1, wherein said second control means comprise a plurality of control members having a fixed function for selection of one of a plurality of basic states of the control system.

6. A control system according to claim 1, wherein the indicating means comprise a double presentation member with a first portion for presentation of program information and a second portion near the control members, for presentation of information which defines the current function of each one of the control members of said group.

7. A control system according to claim 1, wherein the indicating means presents the current function of each control member in said group in the form of text.

8. A control system according to claim 1, wherein, in at least certain operating states, the number of possible functions is greater than the number of control members in said group, and one of said control members selects group by group the possible functions and assigns the selected functions to the control members.

* * * * *